United States Patent
Simon

[15] 3,664,252
[45] May 23, 1972

[54] CAMERA SHUTTER MECHANISM
[72] Inventor: Horst Simon, Fellbach, Germany
[73] Assignee: Eastman Kodak Company, Rochester, N.Y.
[22] Filed: Sept. 4, 1970
[21] Appl. No.: 69,860

[30] Foreign Application Priority Data
Sept. 20, 1969 Germany .................. P 19 47 708.8

[52] U.S. Cl. .................................................. 95/62
[51] Int. Cl. ................................................. G03b 9/14
[58] Field of Search ................ 95/53 R, 58, 59, 60, 62

[56] References Cited

UNITED STATES PATENTS 515,230  2/1894  Jones ........................................ 95/62
3,102,194  8/1963  Van den Broek et al. ............. 95/62 X

FOREIGN PATENTS OR APPLICATIONS 1,217,200  5/1966  Germany ................................ 95/59
1,112,399  8/1961  Germany ................................ 95/59

Primary Examiner—Joseph F. Peters, Jr.
Attorney—Robert W. Hampton and D. P. Hochberg

[57] ABSTRACT

A multi-speed camera shutter mechanism comprises a pair of pivotally mounted blades, each of which is adapted to cover the exposure aperture of the camera. A short exposure period is effected by simultaneously driving the blades in opposite directions, and a longer exposure period is effected by releasably locking one blade in a position wherein it does not cover the aperture and by driving only the other blade to make an exposure.

6 Claims, 3 Drawing Figures

Patented May 23, 1972

HORST SIMON
INVENTOR.

BY *Peter Hochberg*
*Robert W. Hampton*

ATTORNEYS

HORST SIMON
INVENTOR.

BY D. Peter Hochberg
Robert W. Hampton

ATTORNEYS

CAMERA SHUTTER MECHANISM

BACKGROUND OF THE INVENTION

1. Field of the Invention

This invention relates to camera shutter mechanisms, and in particular to shutter mechanisms adapted to selectively effect one of several predetermined photographic exposure periods.

2. Description of the Prior Art

Camera shutters comprising a pair of blades movable about spaced or common pivots to uncover an exposure aperture to initiate a photographic exposure, and to thereafter cover the aperture to terminate the exposure, are well known in the art. Camera shutters of the foregoing type incorporating shutter blades which independently cover the exposure aperture and which cooperate to define an exposure period are also well known.

A variety of mechanisms have been developed for providing two-blade shutter mechanisms in the categories mentioned above, with multi-speed capabilities. U.S. Pat. No. 331,494 teaches a relatively primative approach to the problem of varying shutter speed, by providing members of varying resilience (in this case, rubber bands of varying strength or number) for the different speeds. Other prior art shutter speed control mechanisms, such as those described in German Pat. Nos. 1,155,671 and 1,185,476, incorporate complex retarding devices.

A different approach is disclosed in U.S. Pat. No. 2,638,825, wherein the speed of an impact shutter is varied by changing the position and/or number of springs incorporated in the mechanism. Again, such mechanisms tend to be complex and not completely reliable.

German Pat. No. 536,024 teaches the use of a reflex stop member for controlling the speed of an impact shutter. Reflex stop members have been found to have variable performance, and they tend to cause the camera to jolt during exposure, thereby creating a potential of blurred photographs. Moreover, reflex stop members tend to deteriorate with use. Likewise, U.S. Pat. No. 3,051,066 shows the utilization of a rigid stop member for intercepting a movable shutter blade to obtain different shutter speeds. When the rapidly moving shutter blade strikes the rigid stop member, considerable shock results, causing possible damage to some of the more delicate camera parts, as well as raising the possibility of blurred pictures.

Several variable speed shutters are known which do not have rigid stop members. U.S. Pat. No. 3,205,801, incorporates a spring member for absorbing the shock of a rapidly moving shutter blade and for aiding in the return of the rebounding blade to its initial position, the spring member being movable to different positions to vary the shutter speed. German Pat. No. 48,916 provides a shutter blade having a plurality of different sizes of openings for selectively passing by the camera lens aperture, and a variable pivot point which is changed to control shutter speed. A masking plate is also provided to cover the aperture prior to movement of the shutter blade. German Pat. No. 51,115 provides a pair of shutter blades having a common pivot which cooperate to vary shutter speed, but which do not allow the utilization of conventional diaphragm arrangements. Each of the foregoing devices is characterized by the provision additional and/or complicated components.

SUMMARY OF THE INVENTION

It is an object of the present invention to control the exposure period in a camera.

A more specific object is to control the exposure period in a camera incorporating a shutter mechanism having a pair of shutter blades.

Another object is to select one of two possible shutter speeds in a two blade shutter mechanism in a simple and economical manner.

Other objects will become apparent from the description to follow and from the appended claims.

The foregoing objects are accomplished according to a preferred embodiment of the invention, by the provision of a camera shutter mechanism comprising a pair of shutter blades pivotally mounted on a common axle. The blades are movable in opposite directions between a closed position in which they cover an exposure aperture, and an open position in which they do not cover the aperture. A fast shutter speed is effected by simultaneously driving the blades to uncover, and then cover, the exposure aperture. To obtain a slow shutter speed, one of the blades is displaced and retained in the open position by an appropriate adjustment of a setting member to which the blade is coupled, so that actuation of the shutter drive member results in the operation of only the second blade to make the exposure.

BRIEF DESCRIPTION OF THE DRAWINGS

Reference is made to the accompanying drawings wherein.

DETAILED DESCRIPTION OF THE INVENTION

Figure 1:
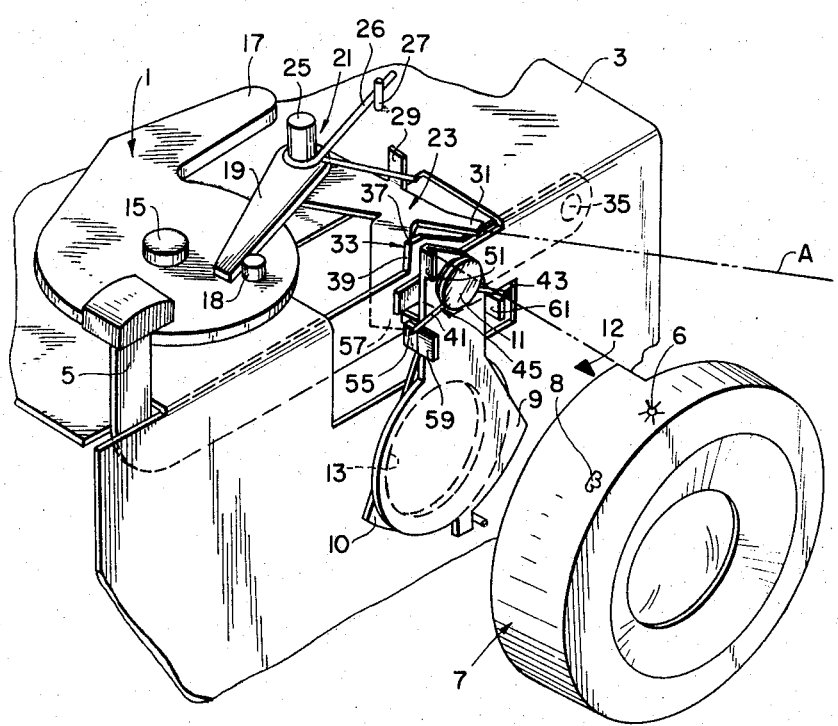
FIG. 1 is a perspective view of a portion of camera incorporating a shutter mechanism according to the invention, the shutter being in a released condition.

Portions of the camera illustrated in the drawings which do not relate to the embodiment of the invention described herein have been omitted, but it is to be understood that the camera can be of any type known in the art to which the invention relates. Referring to the drawings, the camera includes a winding lever 1 for setting the shutter as described below, and preferably serves some other function such as advancing film in the camera, whereby the shutter cocking and film advancing functions can be performed together. The camera further includes a body member 3 to which the various camera elements are mounted, a shutter release member 5 for releasing the shutter from a cocked condition to make an exposure, and a ring 7 for setting the speed of the shutter. Ring 7 can be set to either of two speeds by the alignment of either of indicia 6 (fast speed) or 8 (slow speed) with an arrow 12 adjacent the ring. The terms shutter speed and exposure time are used interchangeably herein, each referring to the period during which light is permitted to enter the exposure aperture to expose film loaded in the camera.

The camera has a shutter mechanism comprising first and second shutter blades 9 and 10, respectively, each depending from, and being pivotally mounted on, an axle 11. Each shutter blade is dimensioned to cover an exposure aperture 13 extending through frame 3 and lying on the light path between the camera objective and the film plane. When either blade covers aperture 13, this light path is blocked to preclude the impingement of light on the film plane.

Figure 2:
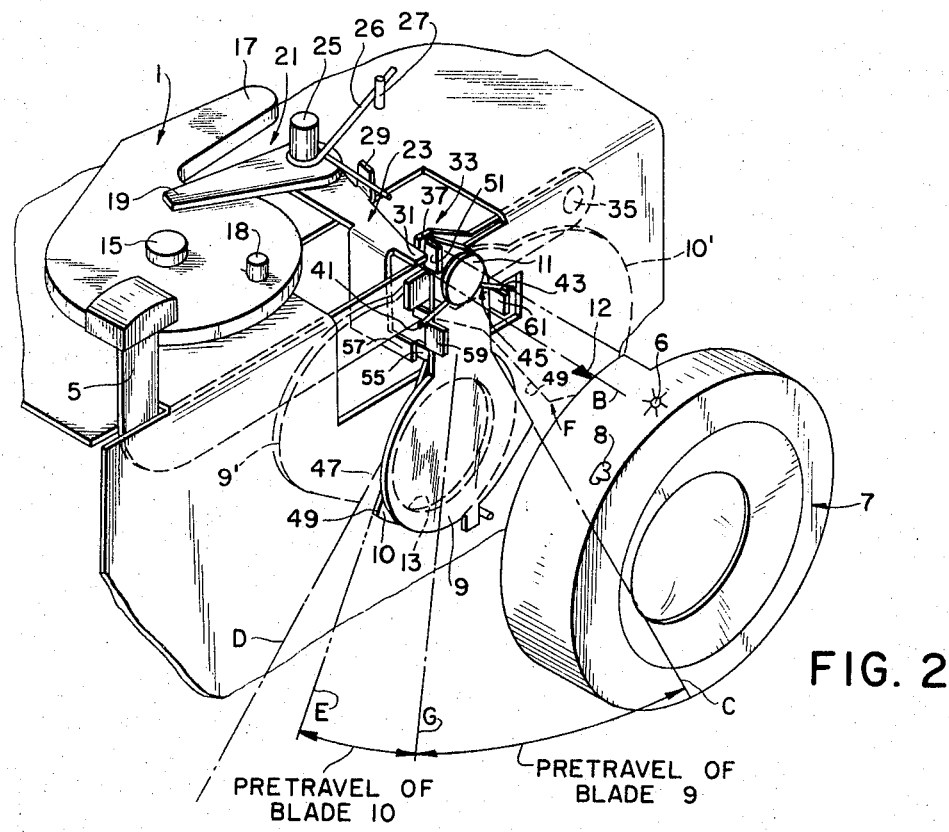
FIG. 2 is a perspective view of the preceding camera, with the shutter shown set for a fast shutter speed.
Figure 3:
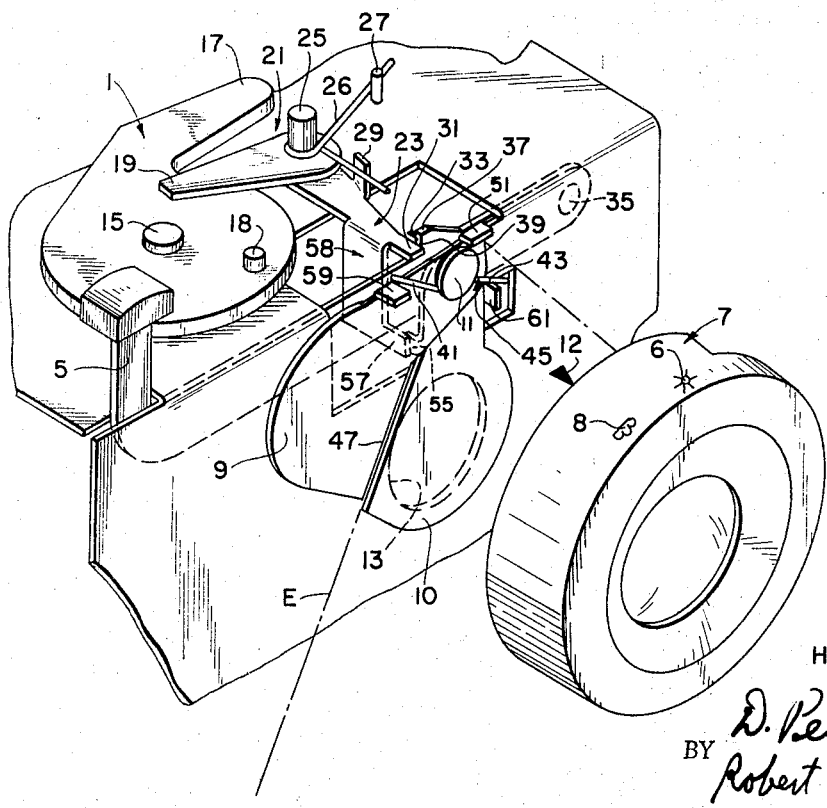
FIG. 3 is a perspective view of the camera of FIG. 1, with the shutter shown set for a slow shutter speed.

The shutter mechanism is shown in its released condition in FIG. 1. In order to cock the shutter, winding lever 1 is rotated counterclockwise about post 15 by means of a manually accessible arm 17. This rotation urges a lug 18 extending from lever 1 into driving engagement with an arm 19 of a shutter driver 21. The latter element comprises arm 19 and a bifurcated arm 23, arms 19 and 23 being fixed together. Shutter driver 21 is pivotally mounted on a post 25 and is biased in a counterclockwise direction by a wire spring 26 entwined on post 25 and engaged at its end sections by a stud 27 on frame 3, and by an upturned tab 29 on arm 23. The rotation of lever 1 thus causes the rotation of shutter driver 21 from its released position indicated by line A in FIG. 1, clockwise against the bias of spring 26. The clockwise movement of shutter driver 21 brings a finger 31 of arm 23 into contact with tapered step 33 of shutter release 5, and finger 31 moves along the upper surface of step 33 to cause shutter release 5 to rotate counterclockwise about an axle 35 on which the release is mounted. The cocking operation is completed when finger 31 passes the crest 37 of step 33, at which time shutter release 5 rotates clockwise under the influence of a return spring (not shown) so that finger 31 is in engagement with the vertical surface 39 of step 33 as shown in FIGS. 2 and 3, and shutter driver 21 thus assumes the position indicated by line B. Upon completion of the foregoing operation, winding lever 1 is rotated to its initial position by a return spring (not shown), and shutter driver 21 is in a cocked condition under the influence of spring 26.

Shutter blades 9 and 10 are biased to their aperture covering positions by legs 41 and 43, respectively, of a wire spring 45 which is entwined on axle 11. Spring 45 could be replaced by a pair of springs, each associated with one of the blades. Blade 9 is movable between a closed position as shown in FIG. 1 and by the solid lines in FIG. 2, (wherein its leading edge 47 is on datum line C), and an open position 9' as indicated in phantom in FIG. 2 (wherein leading edge 47 is located on imaginary line D which is spaced from exposure aperture 13). Similarly, blade 10 is movable between a closed position (wherein its leading edge 49 is on imaginary line E) as shown in FIGS. 1–3, and an open position 10' in which it does not cover aperture 13 (wherein its leading edge 49 is located on imaginary line F). Blade 9 includes an abutment in the form of a tab 51 above axle 11 which lies within the path of shutter driver finger 31, such that movement of shutter driver 21 from the position shown in FIG. 2 to that shown in FIG. 1 causes blade 9 to rotate clockwise about axle 11. Blade 10 is provided with an abutment in the form of a tab 55 which is disposed below axle 11 on the opposite side of the axle from tab 51. Tab 55 lies in the path of a finger 57 extending from arm 23 of shutter driver 21 as indicated in FIG. 2. Therefore, the counterclockwise rotation of shutter driver 21 results in clockwise rotation of shutter blade 9 and the counterclockwise rotation of shutter blade 10. Since finger 31 and finger 57 must cross the positions occupied by tabs 51 and 55, respectively, during the shutter cocking operation, means (not shown) must be provided for preventing the tabs from obstructing the paths of arm 31 and finger 57 during the cocking of shutter driver 21.

Release of the shutter from the condition shown in FIG. 2 results in a fast shutter speed, arrow 12 having been aligned with indicium 6. Thus, the manual depression of release member 5 carries step 33 beneath finger 31, whereby shutter driver 21 is driven counterclockwise under the influence of spring 26. Finger 31 and finger 57 drivingly engage tabs 51 and 55 of the shutters and drive them to their respective open positions 9' and 10' to uncover aperture 13 to initiate an exposure. Exposure commences when blade edges 47 and 49 complete their respective pretravel paths from lines C and E and pass the position indicated by imaginary line G. Thereafter, spring 45, by virtue of the engagement of legs 41 and 43 with tabs 59 and 61 on blades 9 and 10 respectively, drives the blades to their closed positions. Exposure terminates when edges 47 and 49 pass line G.

In order to effect a slow shutter speed, ring 7 is rotated so that indicium 8 is aligned with arrow 12. Blade 9 is coupled with ring 7 such that the setting of ring 7 to the slow speed causes blade 9 to be rotated and held in position 9'. (It should be noted that position 9' referred to previously with regard to the simultaneous movement of blades to their open positions during the exposure making process, and the position 9' of the present discussion, need not necessarily coincide. Thus position 9' refers to any position wherein blade 9 does not cover aperture 13). Such rotation of blade 9 in effect disables the blade so that the making of an exposure is done exclusively by blade 10.

Therefore, to make an exposure at a slow shutter speed, ring 7 is set accordingly and winding lever 1 is rotated to cock the shutter to place the mechanism in the condition illustrated in FIG. 3. Release member 5 is depressed, and shutter driver 21 rotates counterclockwise. Finger 31 passes through its rightward path without obstruction due to the retention of blade 9 in the open position, and finger 57 drives blade 10 counterclockwise to uncover aperture 13. Thereafter, spring 45 rotates blade 10 back to its aperture covering position to terminate the exposure.

The invention has been described in detail with particular reference to a preferred embodiment thereof, but it will be understood that variations and modifications can be effected within the spirit and scope of the invention as described hereinabove.

I claim:

1. In a camera having an exposure aperture, a shutter mechanism for uncovering the aperture to make a photographic exposure, said shutter mechanism comprising:

a first shutter blade movable between a closed position covering the aperture and an open position in which is does not cover the aperture;

a second shutter blade movable between a closed position covering the aperture and an open position in which it does not cover the aperture;

exposure initiating means actuable for moving said first and second shutter blades from their respective closed positions to their respective open positions to initiate an exposure interval;

exposure terminating means actuable for moving said first and second shutter blades from their respective open positions to their respective closed positions to terminate an exposure interval; and means actuable for disabling said first shutter blade by releasably retaining said first shutter blade in its open position to enable the initiation and termination of an exposure interval exclusively by said second shutter blade.

2. A shutter mechanism according to claim 1 wherein said first and second shutter blades are movable in parallel planes, and said blades are pivotally mounted on a common pivot for movement in opposite directions between their respective closed and open positions.

3. A shutter mechanism according to claim 2 wherein:

said first shutter blade includes an abutment located on one side of said pivot;

said second shutter blade includes an abutment located on the side of said pivot opposite said one side; and said exposure initiating means is movable along a predetermined path in one direction into engagement with said abutments to move said shutter blades in opposite directions from their closed positions to their open positions.

4. A shutter mechanism according to claim 1 wherein said exposure terminating means comprises a spring for urging said shutter blades to their respective closed positions.

5. A shutter mechanism according to claim 1 wherein said exposure initiating means comprises a lever having a cocked condition from which said lever is releasable to move said shutter blades to their respective open positions, and a released condition; and said mechanism further comprises a setting member for placing said lever in the cocked condition and a releasing member for releasing said lever from the cocked condition to the released condition.

6. A shutter mechanism according to claim 1 wherein said disabling means comprises a setting member movable between a fast shutter speed position wherein said first shutter blade is movable in response to actuation of said exposure initiating means, and a slow shutter speed setting wherein said first shutter blade is disabled and not movable in response to actuation of said exposure initiating means.

* * * * *